(12) United States Patent
Dinh et al.

(10) Patent No.: US 8,126,138 B2
(45) Date of Patent: Feb. 28, 2012

(54) INTEGRATED SPEAKER ASSEMBLY FOR PERSONAL MEDIA DEVICE

(75) Inventors: Richard Hung Minh Dinh, San Jose, CA (US); Tang Yew Tan, San Francisco, CA (US); Derek Boyd Barrentine, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1422 days.

(21) Appl. No.: 11/650,908

(22) Filed: Jan. 5, 2007

(65) Prior Publication Data

US 2008/0166009 A1 Jul. 10, 2008

(51) Int. Cl.
*H04M 1/00* (2006.01)
*H04M 9/00* (2006.01)
*H04R 1/02* (2006.01)
*H04R 9/06* (2006.01)

(52) U.S. Cl. .................. 379/433.02; 381/332
(58) Field of Classification Search .......... 379/430, 379/433.01, 433.02; 455/575.1, 90.3, 556.1; 381/332–334, 386
See application file for complete search history.

(56) References Cited

U.S. PATENT DOCUMENTS

| | | |
|---|---|---|
| 3,819,879 A | 6/1974 | Baechtold |
| 4,336,861 A | 6/1982 | Peter |
| 5,012,890 A | 5/1991 | Nagi et al. |
| 5,092,424 A | 3/1992 | Schreiber et al. |
| 5,260,681 A | 11/1993 | Asai et al. |
| 5,261,006 A | 11/1993 | Nieuwendijk et al. |
| 5,471,019 A | 11/1995 | Maire |
| 5,479,520 A | 12/1995 | Nieuwendijk et al. |
| 5,642,404 A | 6/1997 | Hsu |
| 5,790,679 A | 8/1998 | Hawker et al. |
| 6,058,293 A | 5/2000 | Phillips |
| 6,389,146 B1 | 5/2002 | Croft, III |
| 6,473,625 B1 | 10/2002 | Williams et al. |
| 6,728,386 B1 | 4/2004 | Anderson |
| 6,758,303 B2 | 7/2004 | Zurek et al. |
| 6,868,602 B2 | 3/2005 | McCullough |
| 6,965,790 B1 | 11/2005 | Mendolia |
| 7,069,061 B2 | 6/2006 | Gammon et al. |
| 7,130,420 B2 | 10/2006 | Windeballe et al. |
| 7,627,343 B2 | 12/2009 | Fadell et al. |
| 2002/0085731 A1 | 7/2002 | Aylward |
| 2004/0203494 A1 | 10/2004 | Eaton |
| 2004/0224638 A1 | 11/2004 | Fadell et al. |
| 2004/0240698 A1 | 12/2004 | Eaton |
| 2008/0149417 A1 | 6/2008 | Dinh et al. |
| 2008/0165999 A1 | 7/2008 | Dinh et al. |

FOREIGN PATENT DOCUMENTS

| | | |
|---|---|---|
| EP | 0489551 | 6/1992 |
| WO | WO 02/34006 | 4/2002 |

*Primary Examiner* — Tuan Nguyen
(74) *Attorney, Agent, or Firm* — Kramer Levin Naftalis & Frankel LLP

(57) ABSTRACT

Systems and methods are provided for media devices including a housing, a frame disposed adjacent to the housing, and an acoustic source that is integrated with the frame for emitting sound from the media device.

35 Claims, 11 Drawing Sheets

INTEGRATED SPEAKER ASSEMBLY FOR PERSONAL MEDIA DEVICE

REFERENCE TO RELATED APPLICATIONS

This application is co-pending with U.S. patent application publication No. 2008/0165999, published on Jul. 10, 2008, entitled "Integrated Microphone Assembly for Personal Media Device", the entire contents of which are incorporated herein by reference.

BACKGROUND

This invention relates to personal media devices and, more particularly, to integrated speaker assemblies for personal media devices.

The proliferation of compact portable personal media devices (e.g., portable MP3 players, portable video players, and media capable cellular telephones) has created a need for delivery of audio (e.g., voice and music) via more durable, reliable, and robust audio sources to users while respecting the need to minimize the overall form factor of personal media devices.

One problem with existing media devices such as cellular telephones is that the media device's acoustic source, e.g., a speaker assembly, is susceptible to external forces that can damage subassembly components such as a diaphragm, electric components, or the housing. For example, a hand-held media device may be dropped by a user. An impact, even from a relatively short distance, could result in structural damage to a speaker assembly mounted on an internal printed circuit board (PCB) or mounted to the housing of the media device. Additionally, a gasket that provides a seal between the speaker assembly and device housing could buckle or become deformed due to the impact, resulting in reduced acoustic coupling from the acoustic source to the external aperture of the device. Accordingly, there is a need for mounting an acoustic source, such as a speaker assembly, in such a way as to reduce the susceptibility of the source to physical stress resulting from, for example, a physical impact on the device or "drop shock."

Another problem with existing media devices is that the structural rigidity of the acoustic source or its surrounding components or materials may not be sufficient to adequately mitigate the effects of vibrations. For example, vibrations induced from another acoustic source, a user, an alarm, or another vibration source could adversely affect, introduce interference, or reduce the acoustic coupling from an acoustic source to the external aperture of the media device. Accordingly, there is a need for enhanced structural rigidity of the acoustic source or its surrounding materials to enable the acoustic source to more efficiently couple audio to the external housing aperture of a media device while mitigating the effects of vibration or other interference.

SUMMARY

The invention, in various embodiments, addresses deficiencies in the prior art by providing systems, methods and devices that enhance the ability of the acoustic source to withstand physical stresses and enhance sound quality while respecting the need for a compact and portable form factor for such devices.

In various aspects, the invention employs an acoustic source, e.g., a speaker assembly, in a media device. The acoustic source is integrated with at least a portion of the frame of the media device. Because a frame provides structural support for the media device, the frame generally has greater structural strength than, for example, a housing or internal circuit board of the media device. By integrating the acoustic source with a frame having greater structural strength and integrity, the ability of the acoustic source to withstand physical stresses or vibrations is enhanced. The term "integrated with" may include integrally formed with, unitarily formed with, attached to, detachably connected to, mounted on, or any like permanent, semi-permanent, or temporary configuration whereby the acoustic assembly, or a portion thereof, is in physical communication or contact with the frame of the media device.

In one aspect, a media device includes a housing, a frame disposed adjacent to the housing, and an acoustic source that is integrated with the frame for emitting sound from the media device. The frame may be disposed substantially within the housing. The frame may include a sidewall or plurality of sidewalls. At least one sidewall may include an aperture in acoustic communication with the acoustic source.

The frame may include a backplane. A portion of the acoustic source may be positioned substantially on a top surface of the backplane. A portion of the acoustic source may be enclosed within an upper casing where the upper casing is attached to the frame. Also, a portion of the acoustic source may be positioned substantially on a bottom surface of the backplane. A portion of the acoustic source may be enclosed within a lower casing where the lower casing is attached to the frame. The frame may be connected to the housing at least one gasket.

Another aspect of the invention includes a method for manufacturing a media device. The method includes providing a housing, attaching a frame to the housing, and integrating an acoustic source with the frame. The integration may include inserting an acoustic source within a recess of the frame. In one feature, an upper casing is mounted to the frame proximate to the acoustic. In another feature, a lower casing is mounted to the frame proximate to the acoustic source.

Various advantages and applications using an acoustic source integrated with a media device frame in accordance with principles of the present invention are discussed in more detail below.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE DISCLOSURE

Figure 1A:
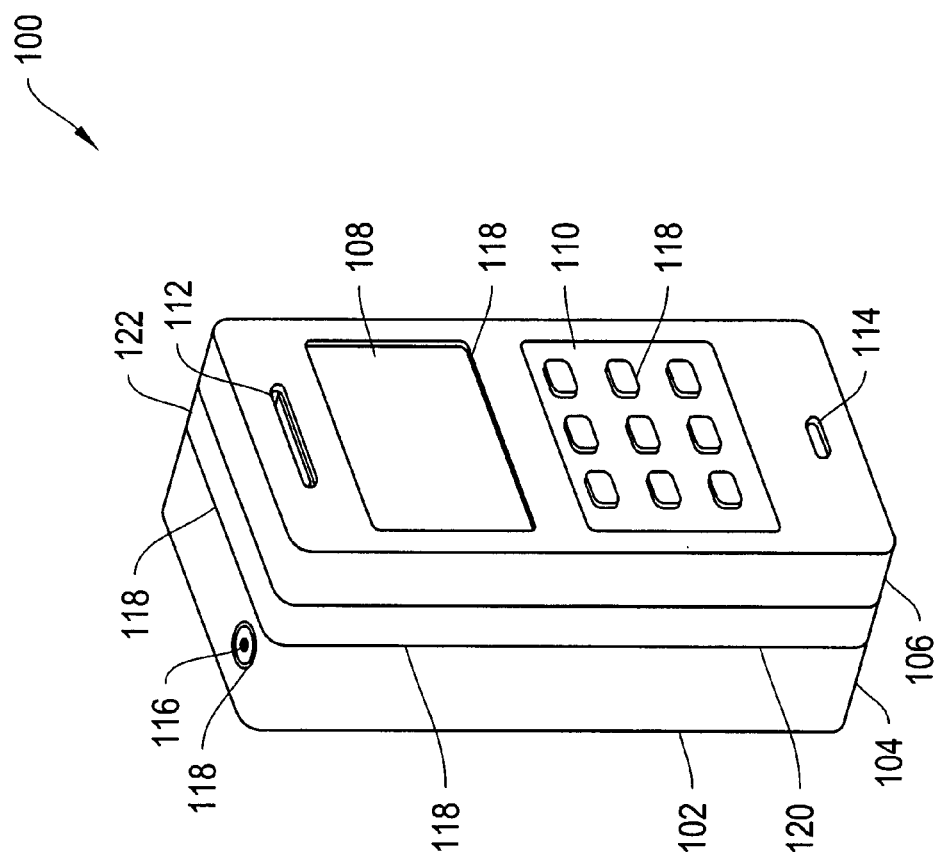
FIG. 1A is a perspective view of a media device with an exposed frame assembly according to an illustrative embodiment of the invention.

FIG. 1A is a perspective view of a media device 100 according to an illustrative embodiment of the invention. The media device 100 includes a housing 102, a first housing portion 104, a second housing portion 106, a display 108, a keypad 110, a speaker housing aperture 112, a microphone housing aperture 114, a headphone jack 116, and frame sidewall 122. Although not shown, in certain embodiments, the frame sidewall 122 is the exposed portion of a frame residing within or adjacent to the housing 102 that provides structural support for the media device 100 and various internal components. The housing 102 also includes various gaps 118 that may include openings, separations, vents, or other pathways between elements of the housing 102 that enable the passage of air or sound through the housing 102.

In one embodiment, the housing 102 includes a first housing portion 104 and a second housing portion 106 that are fastened together to encase various components of the media device 100. In certain embodiments, the housing 102 also includes an exposed frame 120 that provides structural support for the media device 100. The housing 102 and its housing portions 104 and 106 may include polymer-based materials that are formed by, for example, injection molding to define the form factor of the media device 100. In one embodiment, the housing 102 surrounds and/or supports internal components such as, for example, one or more circuit boards having integrated circuit components, internal radio frequency (RF) circuitry, an internal antenna, a speaker, a microphone, a hard drive, a processor, and other components. Further details regarding certain internal components are discussed later with respect to FIG. 3. The housing 102 provides for mounting of a display 108, keypad 110, external jack 116, data connectors, or other external interface elements. The housing 102 may include one or more housing apertures 112 to facilitate delivery of sound, including voice and music, to a user from a speaker within the housing 102. The housing 102 may including one or more housing apertures 114 to facilitate the reception of sounds, such as voice, for an internal microphone from a media device user.

In certain embodiments, the housing 102 includes one or more gaps 118 associated with the housing 102. These gaps 118 may result from the manufacturing and/or assembly process for the media device 100. For example, in certain circumstances, the mechanical attachment of the first housing portion 104 with the second housing portion 106 or the sidewall 122 results in a crease 120 or joint between the portions 104 and 106. In certain media devices 100, the crease 120 is not airtight, resulting in gaps 118 along the crease. Other gaps may be formed during assembly between, for example, one or more keys of the keypad 110 and the housing 102 or the display 108 and the housing 102, resulting in additional gaps 118. In other embodiments, the housing 102 may include additional portions that are integrated to form the housing 102 for the media device 100.

The media device 100 may include a wireless communications device such as a cellular telephone, satellite telephone, cordless telephone, personal digital assistant (PDA), pager, portable computer, or any other device capable of wireless communications. In fact, FIG. 1 shows an exemplary cellular telephone version of a broad category of media device 100.

The media device 100 may also be integrated within the packaging of other devices or structures such a vehicle, video game system, appliance, clothing, helmet, glasses, wearable apparel, stereo system, entertainment system, or other portable devices. In certain embodiments, device 100 may be docked or connected to a wireless enabling accessory system (e.g., a wi-fi docking system) that provides the media device 100 with short-range communicating functionality. Alternative types of media devices 100 may include, for example, a media player such as an iPod available by Apple Computer Inc., of Cupertino, Calif., pocket-sized personal computers such as an iPAQ Pocket PC available by Hewlett Packard Inc., of Palo Alto, Calif. and any other device capable of communicating wirelessly (with or without the aid of a wireless enabling accessory system).

In certain embodiments, the media device 100 may synchronize with, for example, a remote computing system or server to receive media (using either wireless or wireline communications paths). Wireless syncing enables the media device 100 to transmit and receive media and data without requiring a wired connection. Media may include, without limitation, sound or audio files, music, video, multi-media, and digital data, in streaming and/or discrete (e.g., files and packets) formats.

During synchronization, a host system may provide media to a client system or software application embedded within the media device 100. In certain embodiments, media and/or data is "downloaded" to the media device 100. In other embodiments, the media device 100 is capable of uploading media to a remote host or other client system. Further details regarding the capabilities of certain embodiments of the media device 100 are provided in U.S. Pat. No. 7,627,343, issued on Dec. 1, 2009, entitled "Media Player System," the entire contents of which are incorporated herein by reference.

Figure 1B:
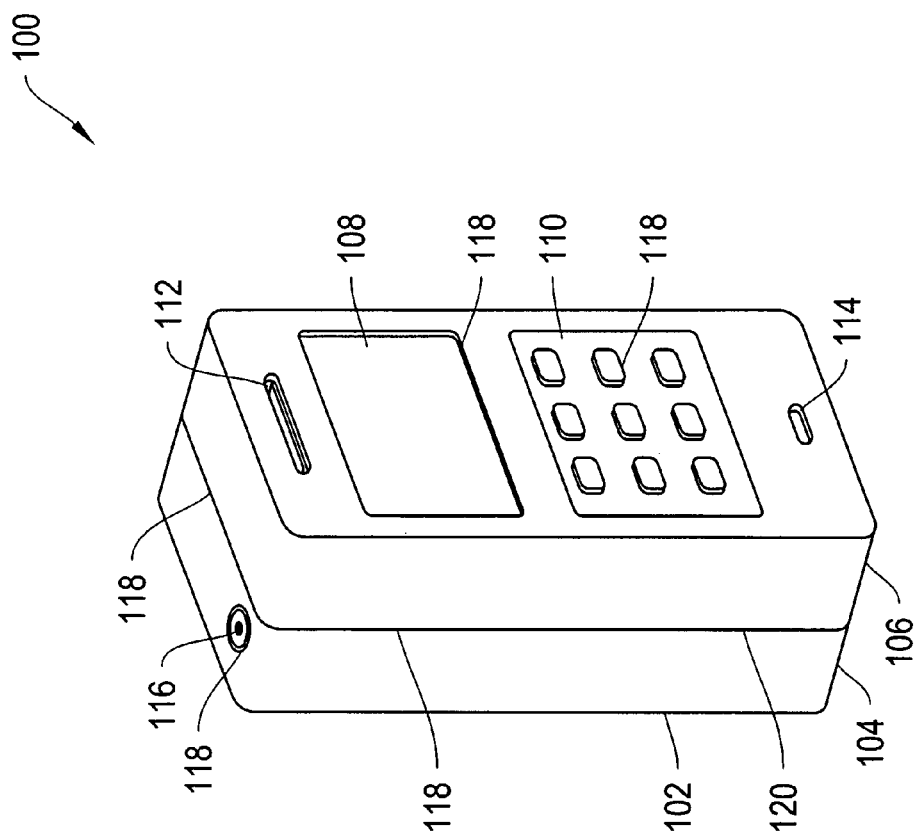
FIG. 1B is another perspective view of a media device according to an illustrative embodiment of the invention.

FIG. 1B is another perspective view of a media device 100 according to an illustrative embodiment of the invention. In this embodiment, as opposed to the embodiment of FIG. 1A, the media device's frame and/or the frame's sidewalls are not exposed to an external surface of the device. However, in certain embodiments, the frame is connected internally with at least a portion of one of the first housing portion 104 or the second housing portion 106.

Figure 2:
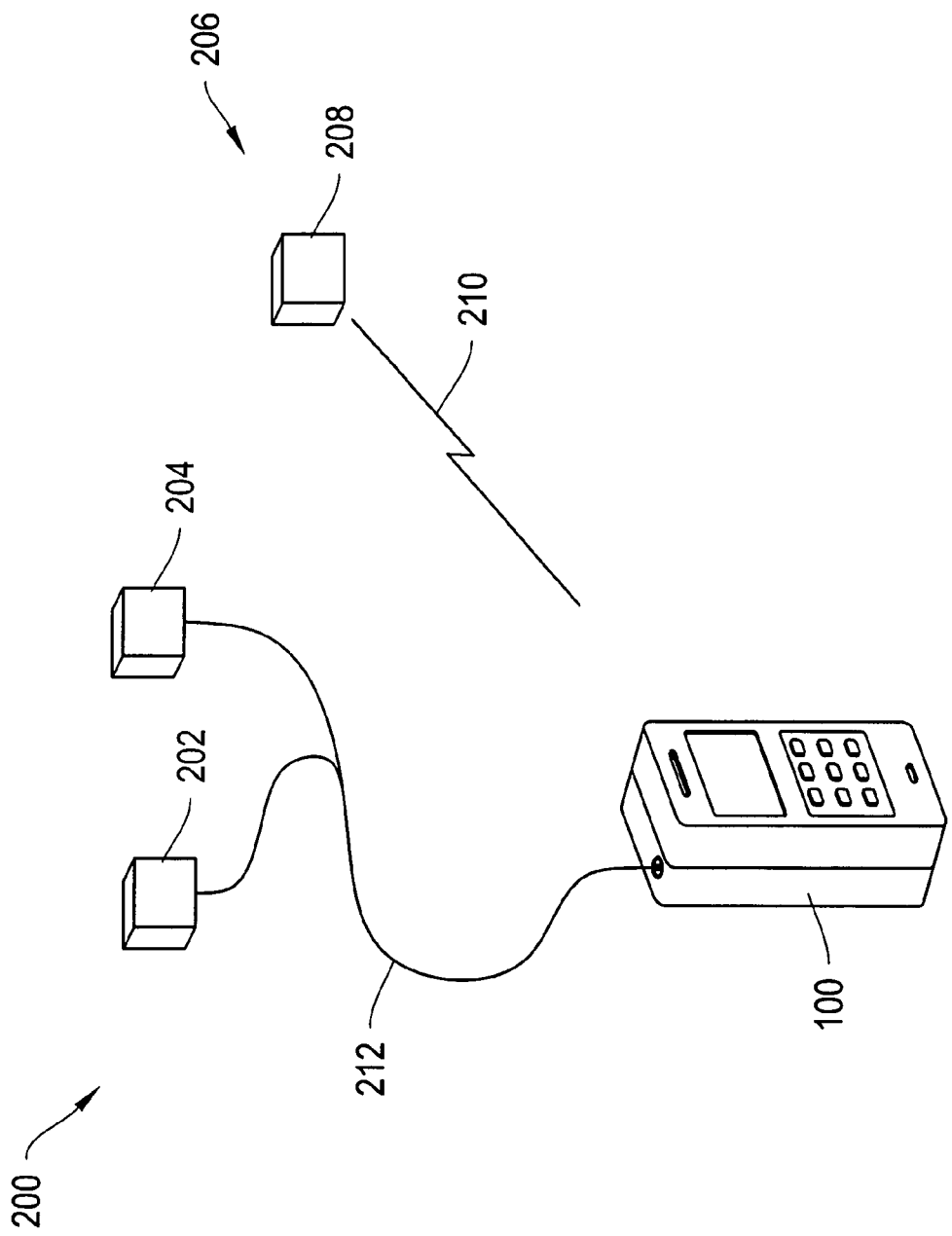
FIG. 2 shows the media device of FIGS. 1A and 1B with tethered headphones and, alternatively, a wireless earpiece according to an illustrative embodiment of the invention.

FIG. 2 shows the media device 100 of FIG. 1 with tethered headphones 200 and, alternatively, a wireless earpiece 206 according to an illustrative embodiment of the invention. The tethered headphones 200 include a cable 212 that connects to the media device 100 via external jack 116. In one embodiment, the cable provides for transport of an audio signal from the media device 100 to the headphones 200. In another embodiment, the headphones 200 include a left housing 202 and a right housing 204, corresponding to the left and right ears of a user, respectively. Each housing 202 and 204 may include a speaker and/or an acoustic assembly as described later with respect to FIG. 4. The headphones 200 may optionally include a microphone to facilitate sending sounds from the user to the media device 100. As an alternative to the headphones 200, a user may utilize the wireless earpiece 206 which includes a housing 208. In one embodiment, the earpiece 206 employs wireless channel 210 to receive audio signals from the device 100 or transmit audio signals to the device 100. The housing 208 may include a speaker, microphone, and/or acoustic assembly as described later with respect to FIG. 4.

Figure 3:
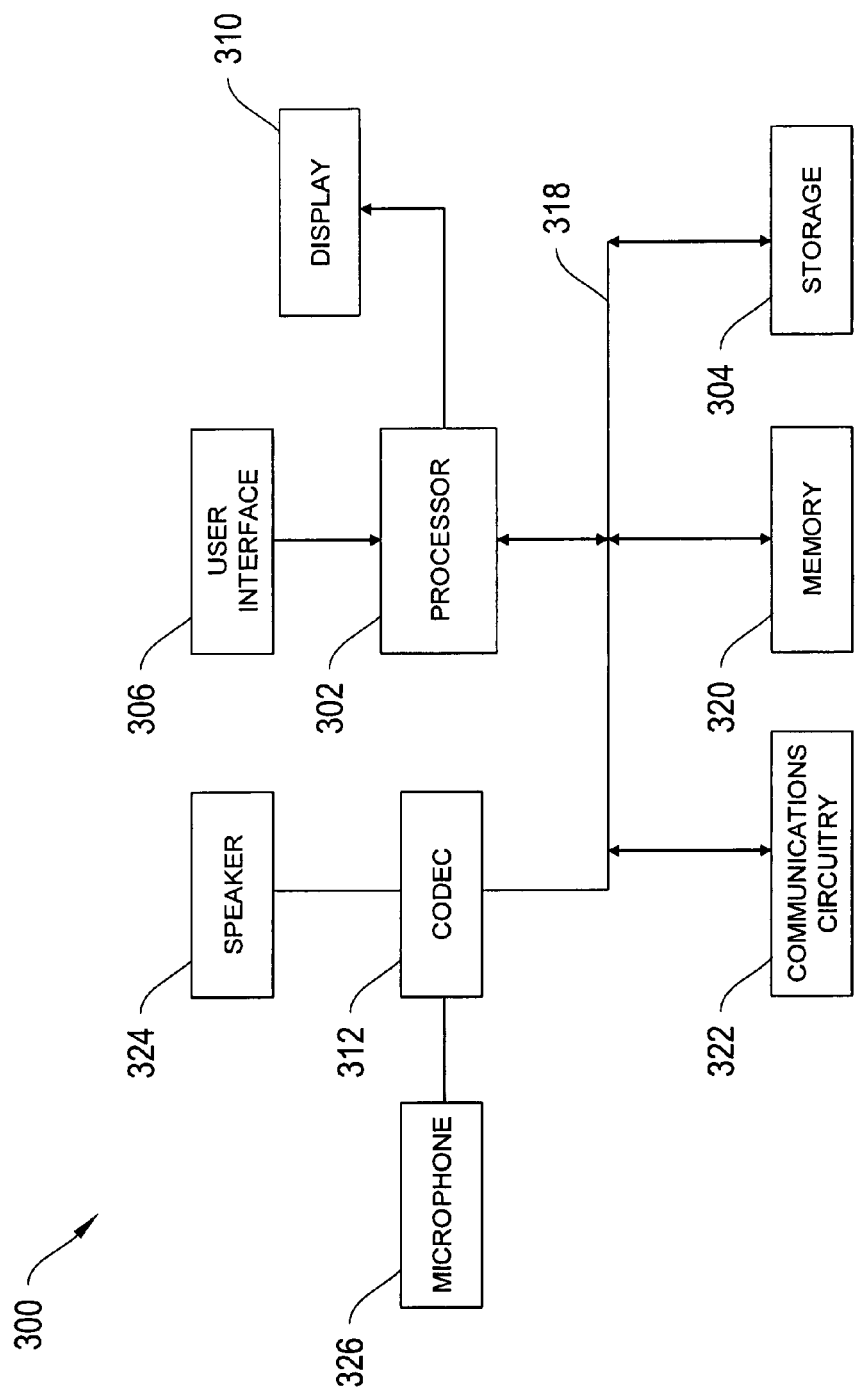
FIG. 3 shows a simplified functional block diagram of a media device according to an illustrative embodiment of the invention.

FIG. 3 shows a simplified functional block diagram of the media device 100 according to an illustrative embodiment of the invention. The media device or player 300 may include a processor 302, storage device 304, user interface 306, display 310, CODEC 312, bus 318, memory 320, communications circuitry 322, a speaker or transducer 324, and a microphone 326. Processor 302 may control the operation of many functions and other circuitry included in media player 300. Processor 302 may drive display 310 and may receive user inputs from user interface 306.

Storage device 304 may store media (e.g., music and video files), software (e.g., for implanting functions on device 300), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable media device to establish wireless communication with another device), subscription information (e.g., information that keeps track of podcasts or television shows or other media a user subscribes to), and any other suitable data. Storage device 304 may include one more storage mediums, including for example, a hard-drive, permanent memory such as ROM, semi-permanent memory such as RAM, or cache.

Memory 320 may include one or more different types of memory which may be used for performing device functions. For example, memory 320 may include cache, ROM, and/or RAM. Bus 318 may provide a data transfer path for transferring data to, from, or between at least storage device 304, memory 320, and processor 302. Coder/decoder (CODEC) 312 may be included to convert digital audio signals into an analog signal for driving the speaker 324 to produce sound including voice, music, and other like audio. The CODEC 312 may also convert audio inputs from the microphone 326 into digital audio signals.

User interface 306 may allow a user to interact with the media device 300. For example, the user input device 306 can take a variety of forms, such as a button, keypad, dial, a click wheel, or a touch screen. Communications circuitry 322 may include circuitry for wireless communication (e.g., short-range and/or long range communication). For example, the wireless communication circuitry may be wi-fi enabling circuitry that permits wireless communication according to one of the 802.11 standards. Other wireless network protocol standards could also be used, either in alternative to the identified protocols or in addition to the identified protocols. Other network standards may include Bluetooth, the Global System for Mobile Communications (GSM), and code divisional multiple access (CDMA) based wireless protocols. Communications circuitry 322 may also include circuitry that enables device 300 to be electrically coupled to another device (e.g., a computer or an accessory device) and communicate with that other device.

In one embodiment, the media device 300 may be a portable computing device dedicated to processing media such as audio and video. For example, media device 300 may be a media player (e.g., MP3 player), a game player, a remote controller, a portable communication device, a remote ordering interface, an audio tour player, or other suitable personal device. The media device 300 may be battery-operated and highly portable so as to allow a user to listen to music, play games or video, record video or take pictures, communicate with others, and/or control other devices. In addition, the media device 300 may be sized such that it fits relatively easily into a pocket or hand of the user. By being handheld, the media device 300 (or media device 100 shown in FIG. 1) is relatively small and easily handled and utilized by its user and thus may be taken practically anywhere the user travels.

As discussed previously, the relatively small form factor of certain prior art media devices has constrained the ability of these media devices to protect certain acoustic components such as speaker or microphone assemblies from damaging physical forces. Also, the quality of sound emitted from an acoustic source or received by an acoustic receptor has been adversely affected by the supporting structure or structures for these acoustic components. For example, a speaker that is mounted on a circuit board may be susceptible to vibrations that are propagated along the circuit board structure which can introduce interference or noise into the speaker's sound output. Accordingly, embodiments of the invention provide for improved sound quality and enhanced structural support for acoustic components such as an acoustic source.

Figure 4:
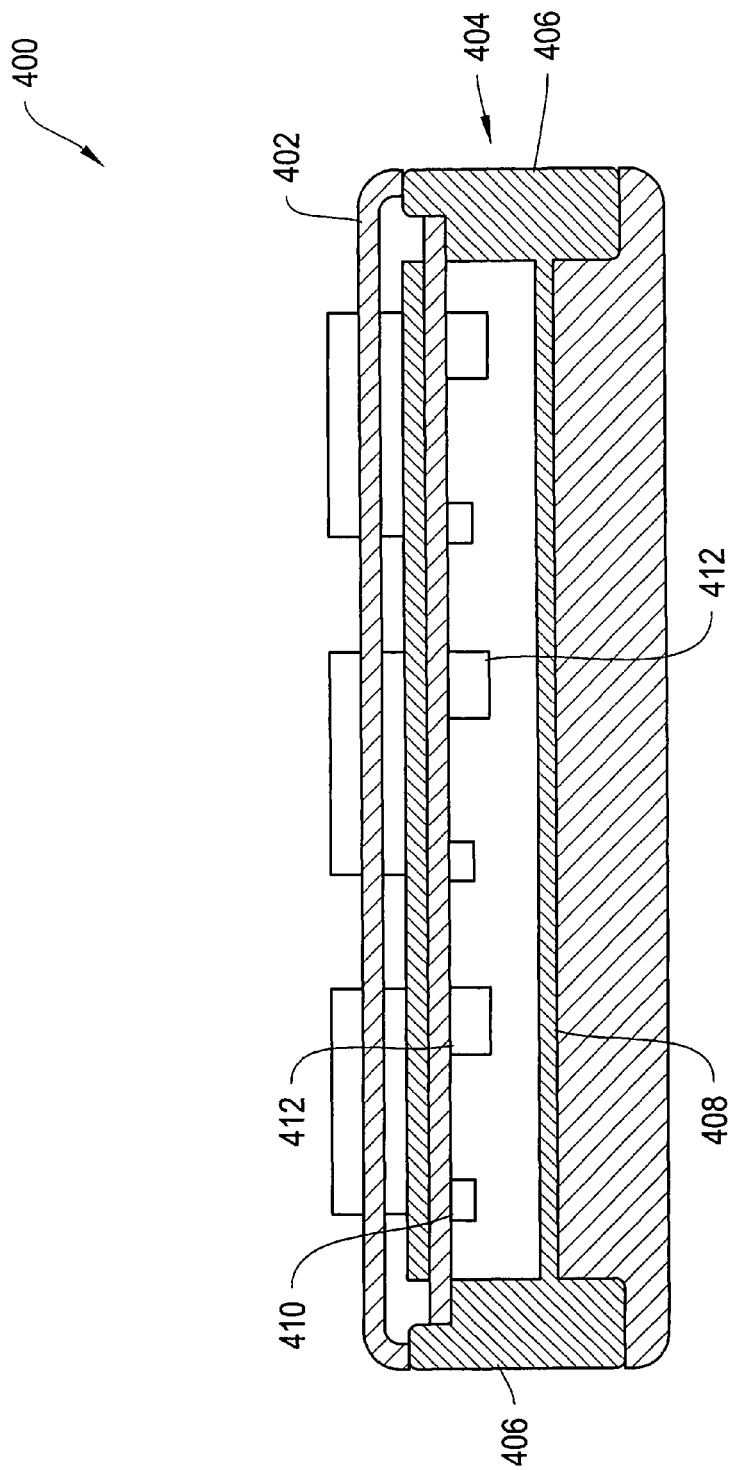
FIG. 4 shows a transverse sectional view of a conventional cellular telephone.

FIG. 4 shows a transverse sectional view of a conventional cellular telephone 400. The conventional cellular telephone 400 comprises an upper housing 402. The main structural frame 404 is secured to the housing 402 which may be fabricated from a die-castable material using a die-casting process. The frame 404 includes a surrounding sidewall 406 and a web or backplane 408. The web 408 extends between the sidewall 406 and forms a printed circuit board compartment between the housing 402 and web 408. The printed circuit board compartment is bounded on the top by the housing 402 and on the bottom by the web 408. The printed circuit board compartment includes a printed circuit board 410 and associated electrical components 412. The web 408 supports or houses a battery 414 which, in turn, forms the back of the cellular telephone 400. The conventional cellular telephone 400 employs a unitized frame member 404 which is composed of a single die-castable material, typically magnesium or zinc, where the sidewall 406 and the web 408 are constructed of the same or different material via a die-cast fabrication technique.

Figure 5:
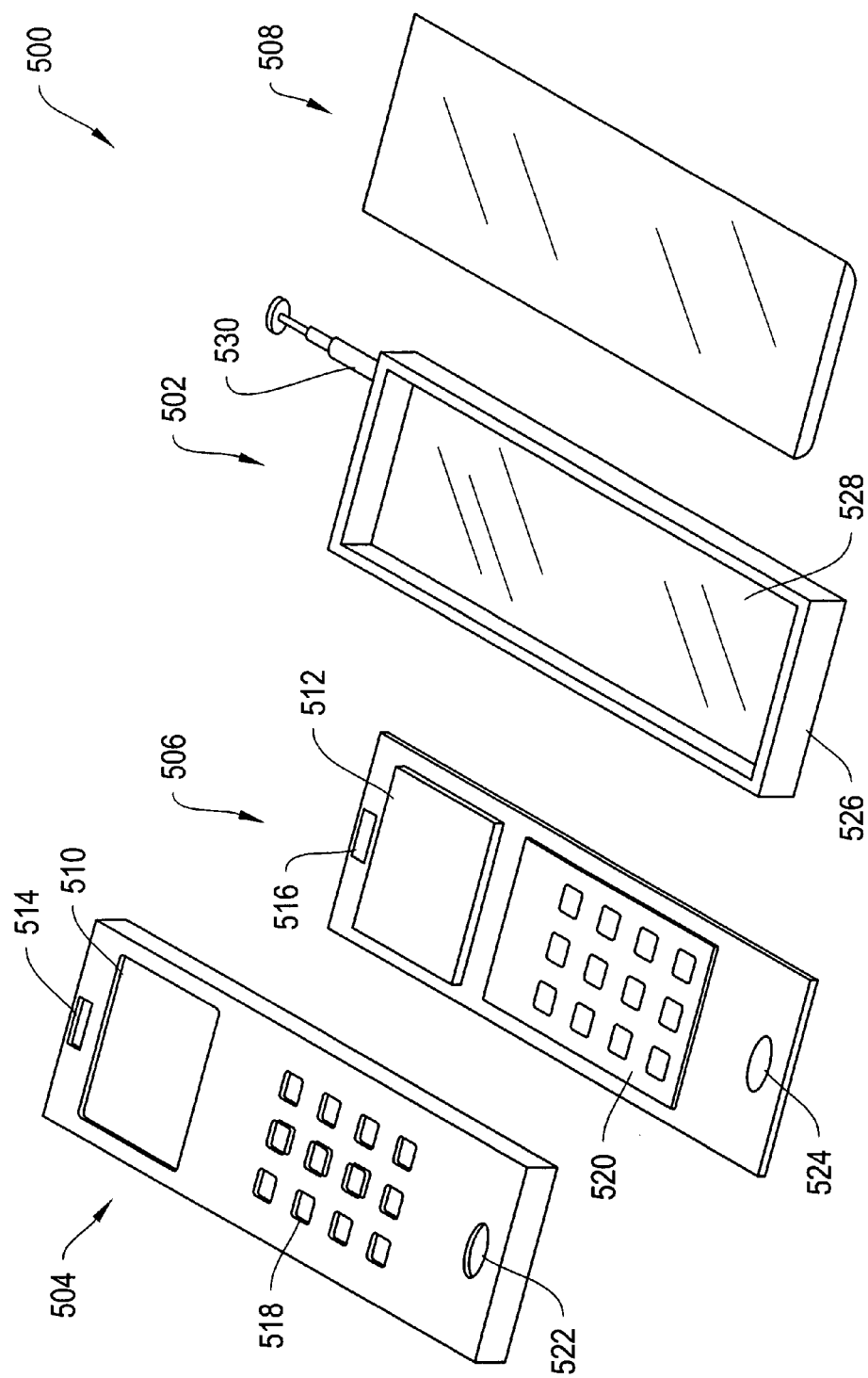
FIG. 5 shows an exploded perspective view of the various sections of a conventional cellular telephone including a frame.

FIG. 5 shows an exploded perspective view of the various sections of a conventional cellular telephone 500 including a frame 502. The cellular telephone 500 generally comprises an upper enclosure or housing 504, a printed circuit board 506, the structural frame member 502, and a battery 508. As shown in FIG. 5, there are a number of features formed on the housing 504 that correspond with components located on the printed circuit board 506. For example, disposed on the exterior face of the housing 504 is a display panel aperture 510 that corresponds with a display panel 512 disposed on the printed circuit board 506.

Adjacent to the display panel aperture 510 is an earphone or speaker aperture 514 that corresponds with a speaker component or assembly 516 on the printed circuit board 506. Also disposed on the face of the housing 504 is an array of keypad apertures 518 that corresponds with a tactile keypad component 520 mounted on the printed circuit board 506. A microphone aperture 522 is located adjacent the keypad apertures 518 that corresponds with a microphone component or assembly 524 which is mounted on the printed circuit board 506.

The cellular telephone 500 includes a structural frame 502, that also includes a surrounding sidewall 526 and a web or backplane 528. An antenna receptacle 530 is formed as part of the frame 502 that enables the transfer of radio frequency (RF) communications with the enclosed printed circuit board 506. The sidewall 526 is formed through a die-casting process using material such as magnesium or zinc or alloys of each. The term die-cast typically refers to a structure formed by a process wherein the casting material is melted into a liquid phase and poured into a die-cast mold. The casting material then assumes the shape of the mold upon cooling and solidification.

The backplane 528 typically includes a thin, high strength formed structure, such as a plate of stainless steel. A formed structure typically includes components that have been stamped, pressed, punched, rolled or otherwise fabricated while the formed material is in a solid phase. The thin plate or backplane 528 is typically secured to the sidewall 526 using a mechanical or die-casting technique.

The backplane 528 typically extends between the surrounding sidewall 526 and divides the enclosed interior space into a printed circuit board compartment and a battery compartment. The printed circuit board compartment is typically bounded on the top by the housing 504, and on the bottom by the backplane 528. The printed circuit board compartment typically contains the printed circuit board 506 and various associated electrical components. The backplane 528 also acts as an upper boundary for the battery compartment. The battery pack 508 can be attached to the frame 502 and forms the back of the cellular telephone 500. It should be understood that the frame 528 typically establishes front and back compartments on each side of the backplane 528.

Figure 6:
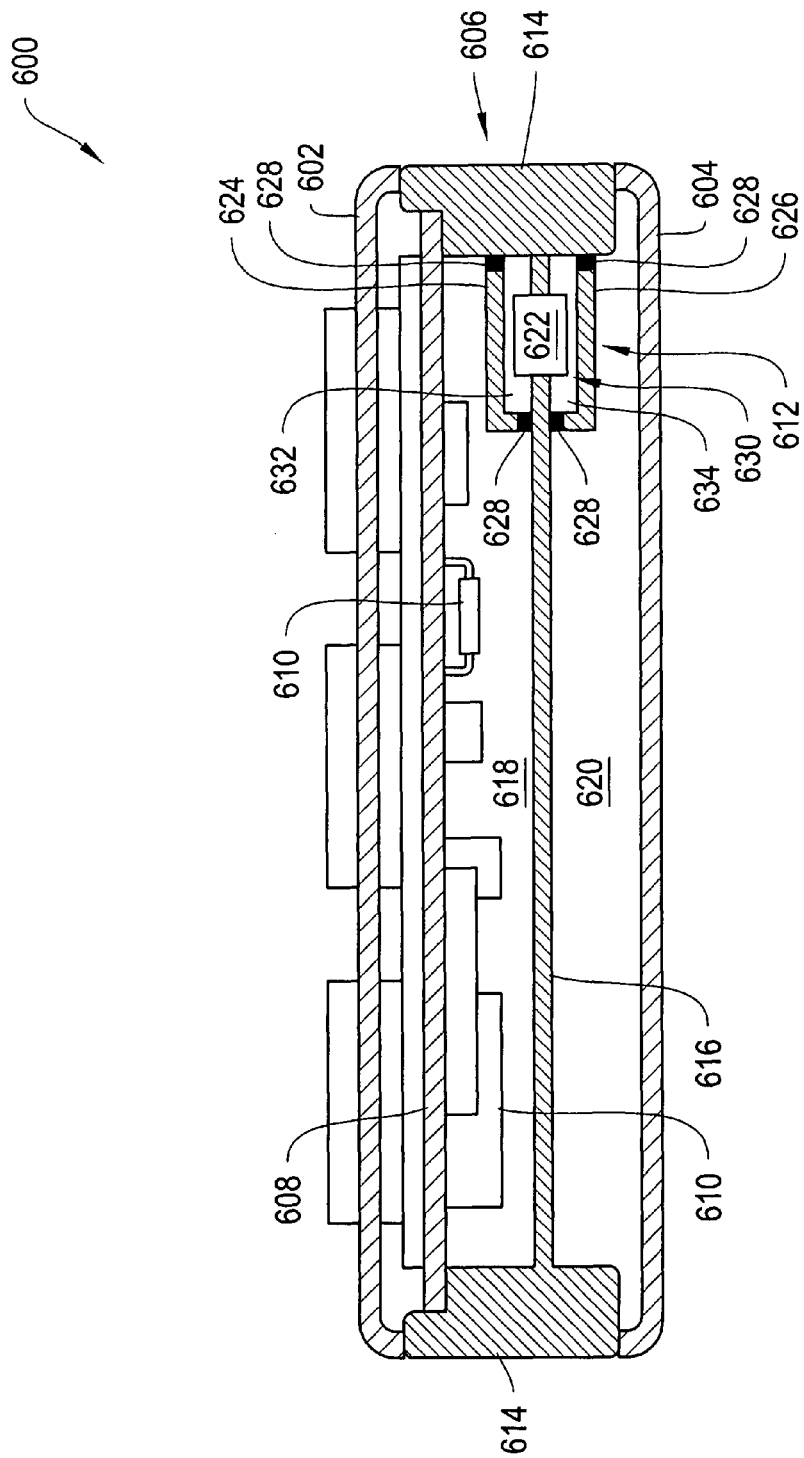
FIG. 6 shows a transverse sectional view of a media device according to an illustrative embodiment of the invention.

FIG. 6 shows a transverse sectional view of a media device 600 according to an illustrative embodiment of the invention. The media device 600 comprises an upper housing 602, lower housing 604, a frame 606, a printed circuit board 608, printed circuit board components 610, and an acoustic source 612. In one embodiment, the acoustic source 612 is integrated with the frame 606 and includes an acoustic subassembly 622, an upper casing 624, a lower casing 626, and casing seals 628. The frame 606 includes a sidewall or sidewalls 614 and a backplane 616. In one embodiment, the main structural frame 606 is secured to at least one of the upper housing 602 and lower housing 604. At least a portion of the housings 602 and 604 may be fabricated from a die-castable material using a process including die-casting, molding, injection-type molding, and/or the like.

In one embodiment, the frame 606 includes a surrounding sidewall 614 or plurality of sidewalls 614 and a web or backplane 616. The web 616 extends between the sidewall 614 or between two or more sidewalls 614 to form a printed circuit board compartment 618 between the upper housing 602 and the web 616. Thus, the printed circuit board compartment 618 may be bounded on the top by the upper housing 602 and on the bottom by the web 616. In certain embodiments, the sidewall 614 extends completely along the perimeter of the frame 606. Alternatively, the sidewall 614 extends along one or more portions of the perimeter of frame 606, effectively forming a plurality of sidewalls 614. In one embodiment, the frame 606 does not have a sidewall 614, but is connected to or integrated with at least one of the upper housing 602 and the lower housing 604 or integrated with at least one of the first housing portion 104 and the second housing portion 106 of the media device 100.

In certain embodiments, the web 616 and lower housing 604 form a second compartment 620 that contains a battery and/or electrical components. The media device 600 may employ a unitized or composite frame 606 that includes a die-castable or other material, such as steel, magnesium and/or zinc, or related alloys, where the sidewalls 614 and the web 616 are constructed of the same or different materials via a die-cast and/or assembly fabrication technique. The assembly fabrication technique may include connecting one or more portions of the frame 606 together using glue, one or more mechanical connectors, or another like attachment mechanism or medium.

In certain embodiments, the acoustic source 612, e.g., a speaker assembly, is integrated with the frame 606 as shown in FIG. 6. As previously discussed, the acoustic source 612 includes an acoustic subassembly 622, an upper casing 624, a lower casing 626, and casing gaskets or seals 628. The acoustic subassembly 622 may be, for example, a speaker subassembly including a diaphragm and other speaker components. By integrating the acoustic source 612 with the frame 606, the frame 606 advantageously protects the acoustic subassembly 622 components from external forces and/or mitigates the effects of vibration or other interference. For example, in some embodiments, web 616 of frame 606 may support acoustic source 612 and may extend beyond an outer surface of an enclosure that encloses at least a portion of the acoustic subassembly 622 (e.g., an enclosure that may be formed by at least upper casing 624 and/or lower casing 626).

In one embodiment, the frame 606 includes a recess 630 within which the acoustic subassembly 622 is disposed. In another embodiment, the acoustic source 612 includes an upper casing 624 that is disposed above the acoustic subassembly 622. In a further embodiment, the acoustic source 612 includes a lower casing 626 that is disposed below the acoustic subassembly 622. One or more casing seals may be employed to fasten either or both the upper casing 624 and the lower casing 626 to the frame 606. Because the upper casing 624 and the frame 606 form an upper volume 632 and the lower casing 626 and frame 606 form a lower volume 634, the upper and lower volumes 632 and 634 may be adjusted by adjusting the size of the upper and lower casings 624 and 626 respectively. By adjusting the size of the volumes 632 and 634, the quality of sound emitted by the acoustic source 612 may be adjusted. In one embodiment, the seals 628 include adhesive to enable the casing 624 and/or 626 to connect with the web and/or sidewall of frame 606.

In an alternative embodiment, the acoustic source 612 is integrated with the frame 606 substantially within the upper casing 624. The acoustic source 612 may include an upper and lower volume, or other volumes, substantially within the upper casing 624. In another alternative embodiment, the acoustic source 612 is integrated with the frame 606 substantially within the lower casing 626. The acoustic source 612 may include an upper and lower volume, or other volumes, substantially within the lower casing 626. Thus, in certain embodiments, the frame 606 includes a casing for an acoustic source 612 on either its top or bottom side as opposed to on both sides of the frame 606.

Although FIG. 6 shows the acoustic source 612 being integrated with the frame 606 while contacting both the sidewall 614 and web 616, the acoustic source 612 may be positioned at any one of a plurality of possible positions on the web 616 and/or between the sidewalls 614. In one embodiment, the upper and lower casings 624 and 626 are connected to the web 616, with or without casing seals 628. The size and shape of the acoustic source 612 and the casings 624 and 626 may vary depending on the available space, desired sound quality, and positioning of other components in the media device 600. For example, the shape of the acoustic source 612 may be, without limitation, rectangular, circular, helical, spherical, stepped, or any other shape dictated by surrounding components and/or other design requirements.

The frame 606 may include one or more apertures, cutouts, openings, and/or recesses to support the acoustic source 612. In one embodiment, the sidewall 614 includes at least one aperture to enable the transport of sound from the acoustic source 612 to outside of the media device 600.

Figure 7:
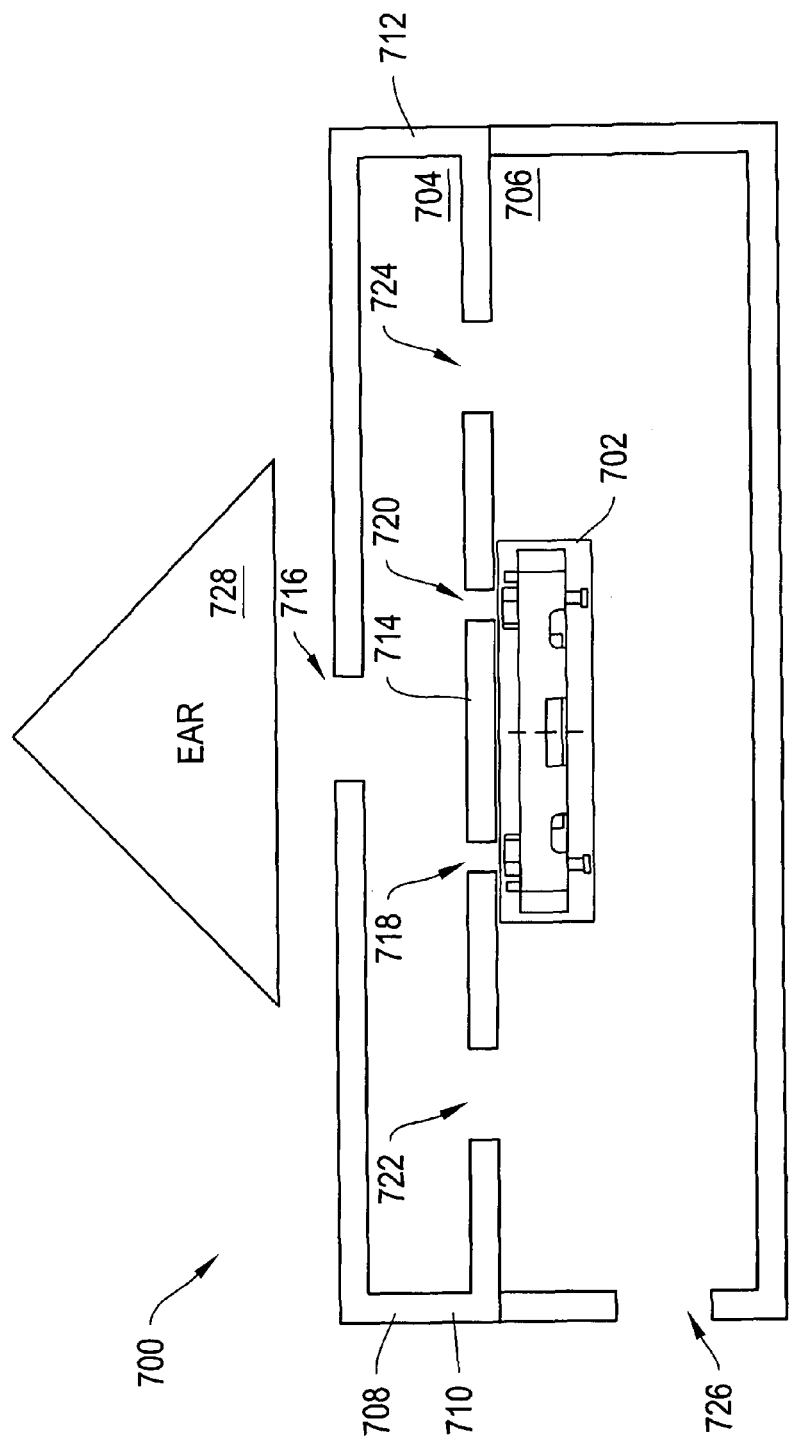
FIG. 7 shows a cross-sectional view of an acoustic assembly according to an illustrative embodiment of the invention.

FIG. 7 shows a cross-sectional view of an acoustic source 700 according to an illustrative embodiment of the invention. The acoustic source 700 includes an acoustic subassembly 702, a first chamber 704, a second chamber 706, a housing 708, a first lateral wall 710, a second lateral wall 712, a retaining wall 714, an output aperture 716, a first source aperture 718, a second source aperture 720, a first transfer aperture 722, a second transfer aperture 724, and a leak aperture 726. A user's ear 728 is typically positioned in proximity to the output aperture 716 to enable the user to receive sound, e.g., voice or music, from the aperture 716. The acoustic subassembly 702 may include a micro-speaker such as a speaker in the 2403 Receiver family manufactured by NXP Semiconductors of Eindhoven, The Netherlands.

In certain embodiments, the acoustic source 700 is included within, for example, the housing 102 of the media device 100 as shown in FIG. 1. In one embodiment, the housing 708 corresponds to the housing 102 of FIG. 1. Thus, the first chamber 704 may be a cavity, void, space, or enclosure within the housing 102. Also, the second chamber may be a second cavity, void, space, or enclosure within the housing 102. In one embodiment, the retaining wall 714 is a portion of the web 616 of the frame 606 of FIG. 6. In other embodiments, at least one of the first lateral wall 710, a second lateral wall 712, a retaining wall 714, an output aperture 716, a first source aperture 718, a second source aperture 720, a first transfer aperture 722, a second transfer aperture 724, and a leak aperture 726 is integrated with a frame such as frame 606 of FIG. 6. In certain embodiments, the acoustic subassembly 702 emits sound through at least one aperture such as apertures 718 and 720 into the first chamber 704. In one embodiment, the second chamber 706 is in contact with or directly coupled to the acoustic subassembly 702. Either chamber 704 or 706 may be filled with air, a gas mixture other than air, a liquid, or other acoustically permeable material. The acoustic subassembly 702 may include a transducer, a speaker, or a micro-speaker. The acoustic subassembly 702 may be referred to as an acoustic receiver which is distinct from an RF receiver.

In one embodiment, the size or area of the leak aperture 726 is derived from a plurality of actual apertures or gaps 118 in the housing 102 (as shown in FIG. 1). In certain embodiments, the effective area of the leak aperture 726 is calculated, measured, and/or algorithmically modeled from an aggregation of the gaps 118 to estimate the effective leak rate of sound from the second chamber 706. In one embodiment, the second chamber 706 includes a cavity within the housing 708 (or housing 102 of FIG. 1) other than the volume of the chamber 704. Thus, the effective area of the aperture 726 may include the sum of the areas of all of the gaps 118 of the housing 102. Because, in certain embodiments, the media device 100 is manufactured and/or assembled using a repeatable and/or predictable process with consistent component dimensions, the effective area and/or leak rate of the aperture 726 can be predicted and/or estimated within a reasonable tolerance for every media device 100. Thus, for example, the volume of the first chamber 704 or the area of the apertures other than the effective aperture 726 may be configured to optimize the tuning of the sound emitted from the aperture 716 for a large volume of media devices 100.

In another embodiment, the acoustic subassembly 702 is disposed in a position that overlaps or is adjacent to only a portion of the output aperture 716. To direct sound or sound waves from the acoustic source 702 to the aperture 716, the acoustic subassembly 702 employs the first chamber 704, i.e., a front cavity, which is defined by the lateral walls 710 and 712 and the retaining wall 714 that extends between the lateral walls 710 and 712. The retaining wall may include at least one transfer aperture such as apertures 722 and 724 that permit sound waves to flow from the first chamber 704 to the second chamber 706. The transfer apertures 722 and 724 may be considered leak apertures from the first chamber 704. In one embodiment, the second chamber 706 includes the internal volume of the media device 100 other than the volume of the first chamber 704. To provide an outlet for sound waves that have leaked into the chamber 706, a plurality of apertures (represented conceptually as leak aperture 726) may be disposed throughout the housing of the media device (e.g., gaps 118). Alternatively, one or more gaps 118 may be selectively machined through the housing 708 to adjust the effective leak aperture 726 size.

In one embodiment, the retaining wall 714 provides a surface to which the acoustic subassembly 702 is affixed. The retaining wall 714 may be a portion of a backplane or web 616 as shown in FIG. 6. The retaining wall may include apertures such as source apertures 718 and 720 that permit the flow of sound waves from the acoustic subassembly 702 into the first chamber 704. In certain embodiments, the transfer or internal leak apertures 722 and 724 permit improved control of the acoustic quality of the sound emitted from the aperture 716.

In certain embodiments, the housing 708 is defined by the upper and/or lower casings 624 and 626 of FIG. 6. In other embodiments, the housing 708 is defined by either the upper casing 624 or the lower casing 626. Thus, for example, the first chamber 704 may be defined by an upper casing 624 while the second chamber 706 is defined by an inner volume of the media device 100 because a lower casing 626 is not present. In another example, only the lower casing 626 may be present wherein the acoustic subassembly resides in the second chamber 706. Thus, the first chamber 704 is defined as a portion of the volume of the housing 102 which may include, for example, the printed circuit board compartment 618 as shown in FIG. 6. In one embodiment, the aperture 716 is included in a portion of the frame 606. More particularly, the aperture 716 may reside within a sidewall 614 of the frame 606, or in the skin of a media device that is adjacent to the frame 606, and thereby enable the coupling of sound to outside of a media device such as media device 100. In an alternative embodiment, the aperture 716 may couple sound to an intermediate chamber for subsequent coupling via another aperture to outside of the media device 100. Further details regarding various embodiments of the acoustic source 700 are described in further detail in U.S. Patent application publication No. 2008/0149417, published on Jun. 26, 2008, entitled "Acoustic Assembly for Personal Media Device," the entire contents of which are incorporated herein by reference.

Figure 8:
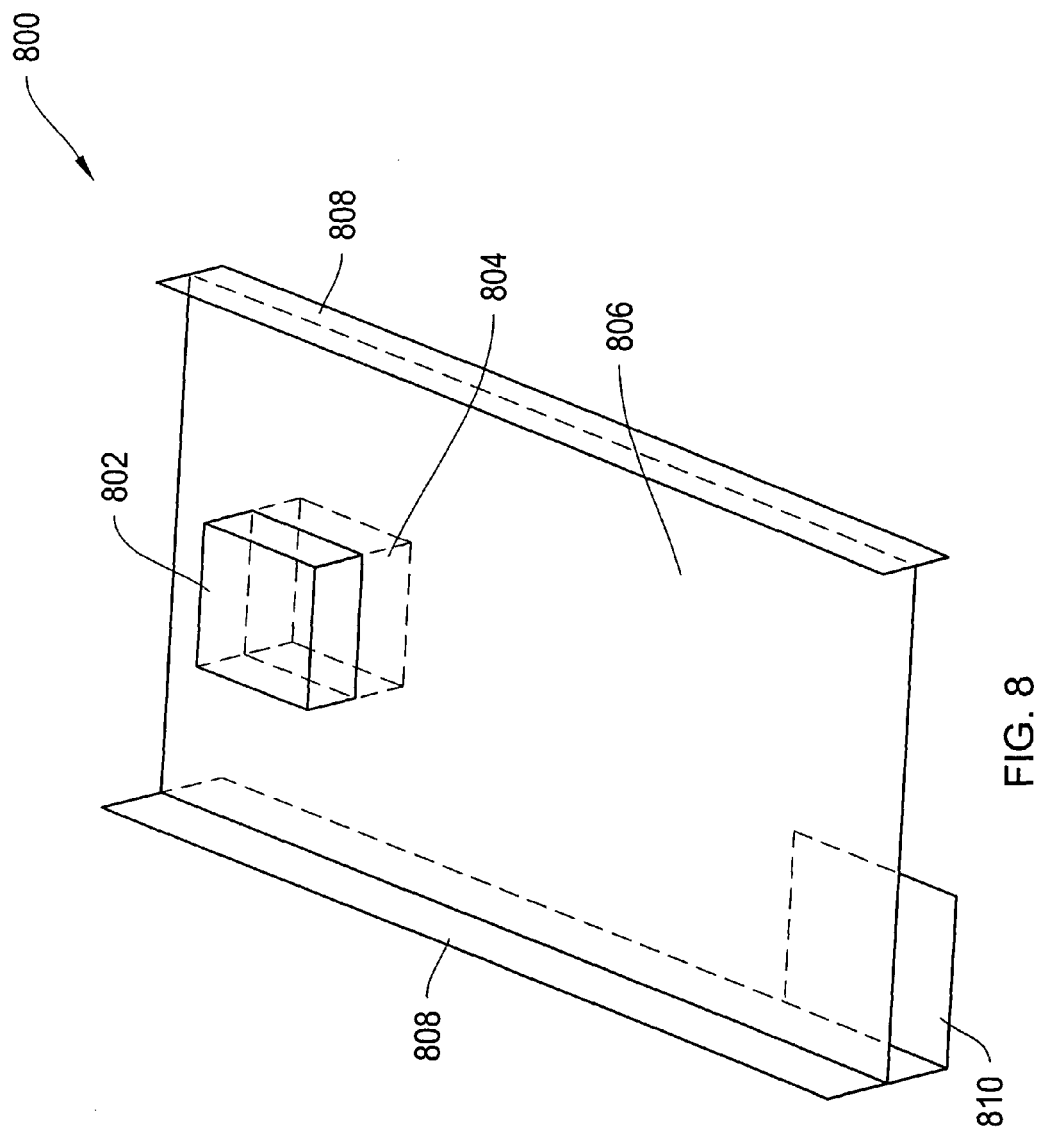
FIG. 8 shows a perspective view of a frame including an integrated acoustic assembly according to an illustrative embodiment of the invention.

FIG. 8 shows a perspective view of a frame 800 including an upper casing 802 and a lower casing 804 for supporting an integrated acoustic source according to an illustrative embodiment of the invention. In one embodiment, the upper and lower casings 802 and 804 are connected to the backplane or web 806 of the frame 800. In addition to providing support and shock protection to an enclosed acoustic subassembly, the casings 802 and 804 provide increased structural support and integrity to the frame 800 itself. In another embodiment, a portion of at least the upper and lower casings 802 and 804 may be connected to a sidewall or sidewalls 808 of the frame 800. The frame 800 may include a backplane 806 that extends between sidewalls 808. Although shown as a solid sheet or plane of material, the backplane 806 may include one or more openings, cut-outs, or voids. In one embodiment, the frame 800 includes only sidewall 808 with substantially no backplane 806. In another embodiment, the backplane 806 includes sections or portions that are stepped or shifted vertically from one another. In yet another embodiment, the frame 800 includes a plurality of backplanes 806 or has portions wherein a plurality of backplane sheets overlap or are positioned in parallel with one another. For example, in one embodiment, the backplane section 810 overlaps and/or is positioned in parallel with the backplane 806, both of which are portions of the frame 800. In a further embodiment, a multilayered frame 800 provides increased firmness and structural integrity for a media device and its various components.

Figure 9:
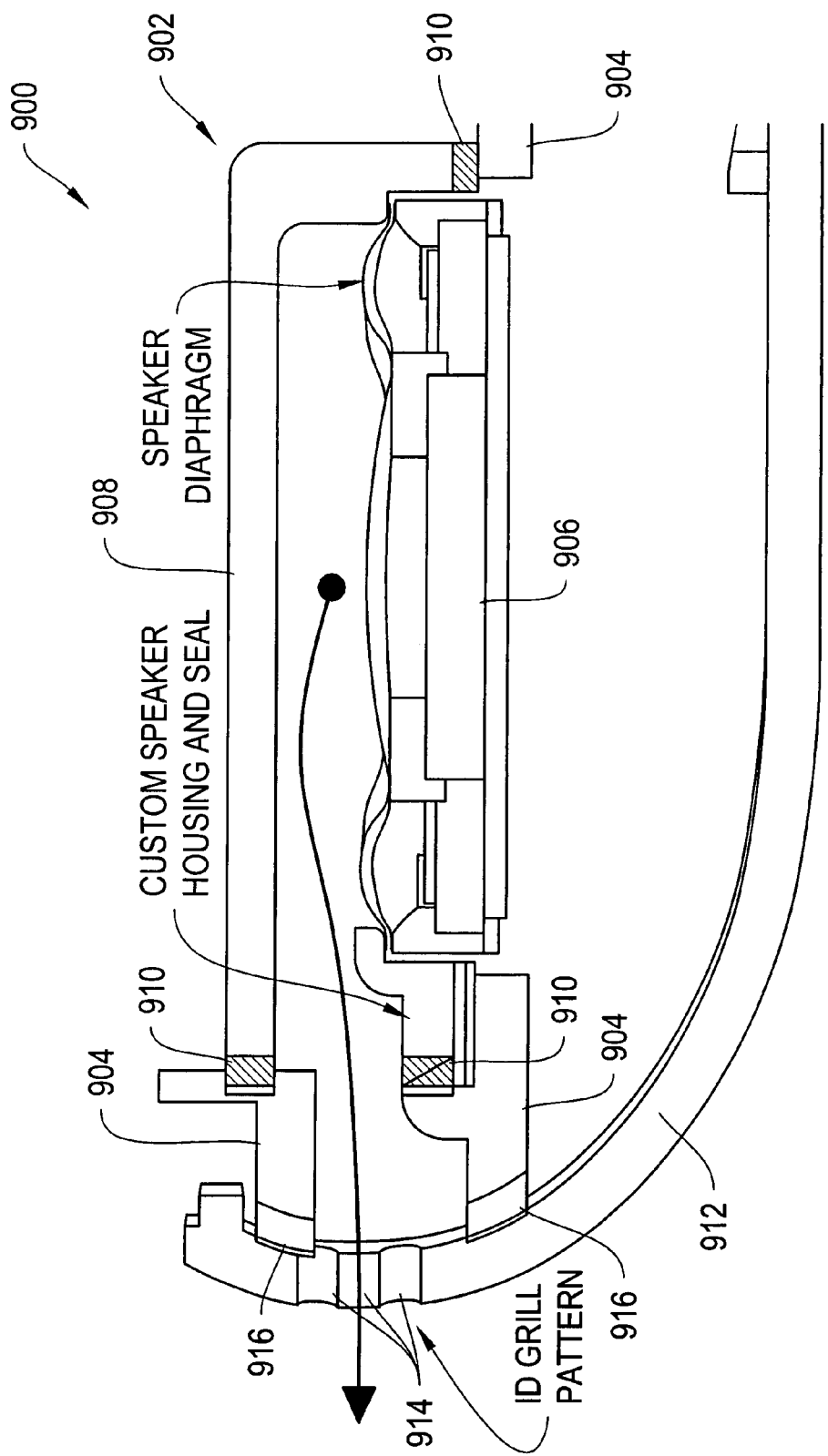
FIG. 9 shows a transverse sectional view of a portion of a media device including an acoustic assembly that is integrated with a frame according to an illustrative embodiment of the invention.

FIG. 9 shows a transverse sectional view of a housing portion 900 of a media device including an acoustic source 902 that is integrated with a frame 904 according to an illustrative embodiment of the invention. The acoustic source 902 includes an acoustic subassembly 906, an upper casing 908, and casing seals or gaskets 910. The housing portion 900 also includes a housing shell or skin 912 having a plurality of output apertures 914 in a grill pattern. The frame 904 also includes seals or gaskets 916. The acoustic subassembly 906 may further employ one or more gaskets for mounting on the frame 904. Because the acoustic subassembly 906 is disposed within or adjacent to the frame 904, relatively short gaskets, with respect to conventional gaskets, may be employed between the acoustic subassembly 906, the frame 904, and the skin 912 to cushion the acoustic subassembly 906 from external forces that could damage or cause interference with the acoustic subassembly 906 components. Without the frame 904 between the acoustic subassembly 906 and/or the skin 912, a longer gasket is required that is susceptible to buckling when exposed to sufficient external force. Once a gasket buckles or is deformed, the gasket's ability to, for example, couple sounds efficiently is reduced. In contrast, the shorter gaskets 910 and/or 916 are able to withstand greater external forces and, therefore, are less susceptible to buckling and deformation due to physical shock. In certain embodiments, the width or thickness of a gasket is less than about 1.5 mm, less than about 1.25 mm, less than about 1 mm, less than about 0.75 mm, less than about 0.5 mm, less than about 0.25 mm, less than about 0.125 mm, less than about 0.1 mm, less than about 0.075 mm, and/or less than about 0.05 mm. Accordingly, by employing these relatively shorter gaskets 910 and 916, a media device becomes more robust and reliable with respect to physical stresses and for delivering quality sound 918.

In certain embodiments, as shown in FIG. 9, the acoustic source 902 is able to provide sound 918 to an output aperture 914 along a curved surface of the skin 912 because the acoustic source 902 can be positioned away from the skin 912. The acoustic source 902 can be positioned a distance away from the skin 912 because the acoustic source 902 is integrated with and/or supported by the frame 904.

Figure 10:
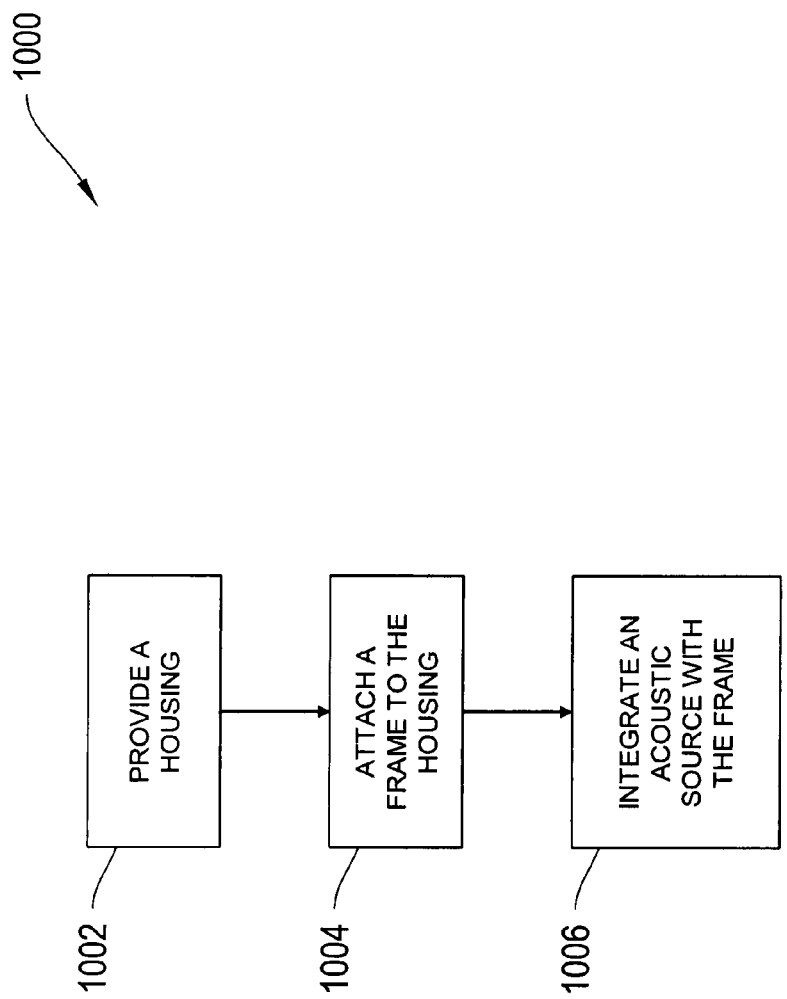
FIG. 10 is a flow chart of a process for manufacturing a media device according to an illustrative embodiment of the invention.

FIG. 10 is a flow chart of a process 1000 for manufacturing a media device according to an illustrative embodiment of the invention. The process 1000, in one embodiment, includes providing a media device housing such as housing 102 of FIG. 1 (Step 1002). Then, attaching a frame such as frame 800 to the housing (Step 1004). Also, an acoustic source such as acoustic source 902 is integrated with the frame to enable the delivery of sound outside of a media device such as media device 100 (Step 1006). The integration of the acoustic source with the frame may include mounting an acoustic subassembly to the frame and then mounting either or both an upper and lower casing to the frame wherein the acoustic subassembly resides.

It is understood that the various features, elements, or processes of the foregoing figures and description are interchangeable or combinable to realize or practice the invention describe herein. Those skilled in the art will appreciate that the invention can be practiced by other than the described embodiments, which are presented for purposes of illustration rather than of limitation, and the invention is limited only by the claims which follow.

What is claimed is:

1. A media device comprising:
    a housing,
    a frame disposed adjacent to the housing, and
    an acoustic source being integrated with the frame for emitting sound from the media device, wherein the frame supports the acoustic source by extending beyond an outer surface of an enclosure that encloses at least a portion of the acoustic source.

2. The device of claim 1, wherein integrated with includes detachably connected to.

3. The device of claim 1, wherein integrated with includes unitarily formed with.

4. The device of claim 1, wherein integrated with includes mounted to.

5. The device of claim 1, wherein the frame is disposed substantially within the housing.

6. The device of claim 1, wherein the frame includes a sidewall.

7. The device of claim 6, wherein the sidewall includes an aperture in acoustic communication with the acoustic source.

8. The device of claim 1, wherein the frame includes a backplane.

9. The device of claim 8, wherein a portion of the acoustic source is positioned substantially on a top surface of the backplane.

10. The device of claim 9, wherein a portion of the acoustic source is enclosed within an upper casing of the enclosure, the upper casing being attached to the frame.

11. The device of claim 8, wherein a portion of the acoustic source is positioned substantially on a bottom surface of the backplane.

12. The device of claim 11, wherein a portion of the acoustic source is enclosed within a lower casing of the enclosure, the lower casing being attached to the frame.

13. The device of claim 1, wherein the frame is connected to the housing at least one gasket.

14. The device of claim 1, wherein the enclosure comprises an upper casing and a lower casing, wherein the frame extends beyond outer surfaces of the upper and lower casings and ends with a sidewall portion adjacent to the housing.

15. The device of claim 1, wherein at least a first portion of the frame comprises a plurality of backplanes, and wherein each one of the plurality of backplanes is positioned parallel with another one of the plurality of backplanes.

16. The device of claim 1, wherein the frame extends through the enclosure and beyond the outer surface of the enclosure.

17. A method for emitting sound from a media device comprising:
    integrating an acoustic source with a frame of the media device, wherein the frame supports the acoustic source by extending beyond an outer surface of an enclosure that encloses at least a portion of the acoustic source, and
    emitting sound from the acoustic source to an external aperture of the housing.

18. The method of claim 17, wherein integrating includes detachably connecting to.

19. The method of claim 17, wherein integrating includes unitarily forming with.

20. The method of claim 17, wherein integrating includes mounting to.

21. The method of claim 17 comprising disposing the frame substantially within the housing.

22. The method of claim 17, wherein the frame includes a sidewall.

23. The method of claim 22, wherein the sidewall includes an aperture in acoustic communication with the acoustic source.

24. The method of claim 17, wherein the frame includes a backplane.

25. The method of claim 24 comprising positioning a portion of the acoustic source substantially on a top surface of the backplane.

26. The method of claim 25 comprising enclosing a portion of the acoustic source within an upper casing of the enclosure, the upper casing being attached to the frame.

27. The method of claim 24, comprising positioning a portion of the acoustic source substantially on a bottom surface of the backplane.

28. The method of claim 27 comprising enclosing a portion of the acoustic source within an upper casing of the enclosure, the upper casing being attached to the frame.

29. The method of claim 24 comprising connecting the frame to the housing at least one gasket.

30. The method of claim 17, wherein the enclosure comprises an upper casing and a lower casing, wherein the frame extends beyond outer surfaces of the upper and lower casings and ends with a sidewall portion adjacent to the housing.

31. The method of claim 17, wherein at least a first portion of the frame comprises a plurality of backplanes, and wherein each one of the plurality of backplanes is positioned parallel with another one of the plurality of backplanes.

32. The method of claim 17, wherein the frame extends through the enclosure and beyond the outer surface of the enclosure.

33. A device comprising:
an acoustic source;
a frame comprising a sidewall portion and a backplane portion extending from the sidewall portion; and
an enclosure that encloses at least a portion of the acoustic source, wherein the backplane portion extends through the enclosure, and wherein the sidewall portion is external to the enclosure.

34. The device of claim 33 further comprising a housing secured to the sidewall portion.

35. The device of claim 33 further comprising at least one gasket sealing the enclosure about at least a portion of the backplane portion.

* * * * *